US007269624B1

(12) United States Patent
Malik

(10) Patent No.: US 7,269,624 B1
(45) Date of Patent: Sep. 11, 2007

(54) METHOD AND APPARATUS FOR DYNAMICALLY MANAGING ELECTRONIC MAIL MESSAGES ON A REMOTE ELECTRONIC MAIL MESSAGING SYSTEM

(75) Inventor: Dale W. Malik, Dunwoody, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 847 days.

(21) Appl. No.: 09/739,816

(22) Filed: Dec. 20, 2000

(51) Int. Cl.
*G06F 15/16* (2006.01)
(52) U.S. Cl. .................................. 709/206; 709/223
(58) Field of Classification Search ............... 709/206, 709/223–226
See application file for complete search history.

(56) References Cited

U.S. PATENT DOCUMENTS

| | | | | |
|---|---|---|---|---|
| 6,230,156 B1* | 5/2001 | Hussey | | 709/206 |
| 6,253,202 B1* | 6/2001 | Gilmour | | 707/9 |
| 6,272,532 B1* | 8/2001 | Feinleib | | 709/206 |
| 6,430,598 B1* | 8/2002 | Dorrance et al. | | 709/203 |
| 6,629,130 B2* | 9/2003 | Mertama et al. | | 709/206 |
| 6,640,229 B1* | 10/2003 | Gilmour et al. | | 707/9 |
| 6,647,384 B2* | 11/2003 | Gilmour | | 707/5 |
| 6,654,787 B1* | 11/2003 | Aronson et al. | | 709/206 |
| 6,658,454 B1* | 12/2003 | Delany et al. | | 709/202 |
| 6,697,942 B1* | 2/2004 | L'Heureux et al. | | 709/206 |
| 6,779,022 B1* | 8/2004 | Horstmann et al. | | 709/206 |
| 6,816,884 B1* | 11/2004 | Summers | | 709/206 |
| 6,965,918 B1* | 11/2005 | Arnold et al. | | 709/206 |
| 6,999,993 B1* | 2/2006 | Shah et al. | | 709/207 |
| 2002/0073159 A1* | 6/2002 | Jain | | 709/206 |
| 2002/0091829 A1* | 7/2002 | Wood et al. | | 709/227 |
| 2002/0194178 A1* | 12/2002 | Gilmour et al. | | 707/9 |

OTHER PUBLICATIONS

Chapman, D. Brent. Majordomo: How I Mangae 17 Mailing Lists Without Answering "-request" Mail. 1992 LISA VI, Oct. 19-23, 1992, Long Beach, CA. 135-144.*
Netscape Mail Server Administrator's Guide. Version 2.0. Netscape Communications Corporation, 1996.*
cc:Mail for Windows User's Guide. Version 2.0. Mountain View, CA: Lotus Development Corporation, 1993.*
Crispin, M. RFC 1730: Internet Message Access Protocol-Version 4. Dec. 1994.*
Graham, Jay. "Enterprise Wide Electronic Mail using IMAP." Proceedings of the 27th annual ACM SIGUCCS Conference on User Services: Mile High Expectations. ACM Press. Nov. 1999. 83-85.*
Berchtold, Stefan et al. "SaveMe: A System for Archiving Electronic Documents Using Messaging Groupware." Proceedings of the International Joint Conference on Work Activities Coordination and Collaboration. Mar. 1999. ACM Press. 167-176.*
Hoffman, Paul. "Putting it Together: Designs on Internet Mail." netWorker. vol. 2, Issue 1. Mar. 1998. pp. 19-23.*

* cited by examiner

*Primary Examiner*—Jason Cardone
*Assistant Examiner*—Jeffrey R Swearingen
(74) *Attorney, Agent, or Firm*—Thomas, Kayden, Horstemeyer & Risley

(57) ABSTRACT

A system and method for receiving email instructions allowing users to remotely manage email messages on a specially adapted email server. The adapted email server comprises a registration module and database and other programming logic for verifying the user and determining the user's instructions for managing the email on the server. The user may advantageously manage email messages using any standard email client without the need to actually log in to the server system.

49 Claims, 3 Drawing Sheets

METHOD AND APPARATUS FOR DYNAMICALLY MANAGING ELECTRONIC MAIL MESSAGES ON A REMOTE ELECTRONIC MAIL MESSAGING SYSTEM

BACKGROUND

1. Field of the Invention

The present invention relates to the transmission of electronic messages over computer networks, and more particularly, to a method and apparatus for managing and manipulating a plurality of electronic messages on the basis of pre-determined criteria.

2. Background of the Invention

During the past decade, electronic mail messages ("email") have become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

For a variety of reasons, many email users typically maintain email accounts with multiple email service providers. For example, a user may have a business email account, a personal email account with a paid service provider, and a personal email account with a free email service provider. Moreover, users may have email accounts for use with interactive paging systems or other handheld electronic messaging devices (e.g., personal data advisor, wireless telephone, etc.). Typically, each email service provider will assign a unique email address to each subscriber of the service. The email address generally corresponds to the user's account on a email host managed by the service provider. As known in the art, one or more email hosts may be used to process inbound email while one or more different email hosts may be used to process outbound email. Alternatively, the same hosts could be used for processing both inbound and outbound email messages. In the present example, although only a single email host is shown for each network, it is to be understood that multiple email hosts may be used in actual implementation of an email network.

FIG. 1 shows examples of common service providers typically employed by email users for sending and receiving email. For example, the user may have one or more accounts with one or more email service providers directly connected to Internet email network 10, such as e.g., a service provided via email host 12. Such accounts are generally accessible via any computer or network in communication with Internet email network 10. Computers on Internet email network 10, e.g., email host 12 or computer 14, may be in communication with each other and with computers on other networks, such as Internet Service Provider ("ISP") network 20, wireless network 30, interactive paging network 40, or private network 50. Some email service providers offer purely Internet-based email services. Such services are accessible to subscribers already having connectivity to the Internet. For example, a user on computer 14, already connected to Internet email network 10, may subscribe to email services hosted on email host 12. The user in this case may be assigned an email address such as: john@emailhost12.com. In addition to using computer 14, the user may access his or her email via other computers, such as, e.g., computers 24 or 54 shown in FIG. 1. Typical examples of such Internet-based email service providers include, e.g., Hotmail.com, Yahoo.com, and the like.

As noted above, the user may have multiple email accounts through multiple service providers. For example, in addition to the account on email host 12, the user may have an email account on email host 22 on ISP network 20. In the present example, the user may be assigned an email address such as john@emailhost22.net. As with the Internet-based email services, email services provided by ISPs are generally accessible from any computer on the Internet. For example, the user may access email via computer 24, connected to ISP network 20, or via computers 14 or 54 on Internet email network 10 and private network 50, respectively.

As shown in FIG. 1, the user may have more specialized email accounts delivered via other networks. For example, the user may send and receive email via wireless network 30 and email host 32. Wireless devices, e.g., telephone 34 or personal digital assistant ("PDA") 36, may be used to send and receive email to or from other wireless devices on wireless network 30 or other email systems connected via Internet email network 10. The user may also have an email account on interactive paging network 40 and associated email host 42. The user in this case may use interactive pager 44 to send and receive email to any other Internet email address. Finally, the user may have an email account on private network 50 hosted on email host 52. The email service provider in this case could be, e.g., the user's employer and the email messaging system hosted on email host 52 could be a proprietary email application server. Moreover, email accounts hosted on email host 52 may only be accessible using a computer directly connected to private network 50 and may require a proprietary client application running on computer 54.

Users typically are assigned different email address for each individual email account. For example the user may have email addresses: jdoe@emailhost32.wireless.com, jdoe@emailhost42.paging.net, and john_doe@emailhost52.work.com corresponding to wireless network 30, interactive paging network 40 and private network 50, respectively. As described more fully below, such specialized email services typically are not accessible from any computer on the Internet.

A problem for users having such multiple email accounts is that there may be different hardware, software and communications systems requirements for accessing the email stored on each account. For example, some email service providers allow users to access their email via any computer connected to the Internet using a variety of suitable email client programs. Suitable client programs may include web browser client applications, such as applications available from Microsoft Corporation or Netscape Corporation, or other applications using suitable email communications protocols. Commonly used email communications protocols include, e.g., Post Office Protocol ("POP" or "POP3") or Internet Message Access Protocol ("IMAP" or "IMAP4"). Other email service providers, may require proprietary software such as, e.g., Lotus Notes, or Groupwise. In addition to different software requirements, there may be other barriers for managing and accessing email on multiple accounts using a single interface. For example, private networks may allow access to email services only via certain communications channels, such as, e.g., a direct dial-up network connection to a private network comprising the email host, or only from computers within a defined physical perimeter. Also, an email service provider may only offer access to email accounts via special hardware, such as a wireless telephone or interactive pager.

A problem therefore exists for users having multiple email accounts because access to each email account using a single device may not be possible. One method used to get around this problem has been to set up automatic forwarding procedures from each account to a central account. Using this method, the user need only ensure access is available to this central account to have access to all of his or her email. This method has numerous drawbacks, e.g., there is little or no segregation of the user's email making it more difficult to separate work accounts from personal accounts; depending on the account used to receive all email, attachments may not be readable; and in some cases, the user is identified as the sender of the email making it more difficult to identify and prioritize the email. Another drawback is that the user must have access to the central account any time he or she wishes to review email messages. However, users may not always know in advance where they will be located and what type of email access will be available.

SUMMARY OF THE INVENTION

The present invention comprises a system and method for remotely managing email messages on a source server. The system comprises a database of destination email addresses corresponding to subscriber accounts authorized to remotely manage email messages. To remotely manage email on the source server, the subscriber (also referred to herein as the "user") sends management instructions via email messages transmitted to the source server from one of the subscriber's destination email addresses. Accordingly, the instruction email messages have a valid destination email address in the message sender-id field. The instruction email message may have a special code in some predetermined field, or, alternatively, the instruction email message may be addressed to a special account on the subscriber's source server. When the source server receives an instruction email message (identified by the special code or because it was addressed to a special account), the source server checks the database to verify the destination email address as an authorized account. If the destination address is valid, i.e., the address has been registered, the source server source server interprets the subscriber's instructions and performs the requested management tasks on email in the user's account on the source server.

The instruction message may contain a command providing the user's instructions to the source server. Alternatively, if the message contains no command, the source server may perform a default action on the user's email messages. The instruction message may further include criteria for identifying the email messages to be operated on by the source server. The criteria may include boolean operators and provide conditions or rules for determining whether or not a message is to be included. The criteria may also include strings of data and associated email message fields which should be searched for matching email messages. Accordingly, the user can specify, with some particularity, which messages in his or her email account on the source server will be managed. The email managed according to the present invention may comprise email messages in the user's inbox, the user's outbox or both mailboxes on the source server.

In a preferred embodiment of the present invention, a registration module and database are provided for administering users' destination email addresses. The database comprises a list of destination email addresses associated with each user. The database may further comprise device type data associated with each destination email address. This additional information may be used to determine whether or not the device type is compatible with the user's instructions. In this embodiment, if the device is not compatible, the system may modify the user's instruction according to the device type.

It is an object of the present invention to provide a system and method for remotely managing email messages on an email server using a remote email account.

It is another object of the present invention to enable users to remotely manage email messages on an email server using a remote email account with a standard email client interface.

It is another object of the present invention to allow an email user to retrieve email from one email account to a remote email account.

These and other objects of the present invention are described in greater detail in the detailed description of the invention, the appended drawings and the attached claims.

DETAILED DESCRIPTION OF THE INVENTION

Figure 1:
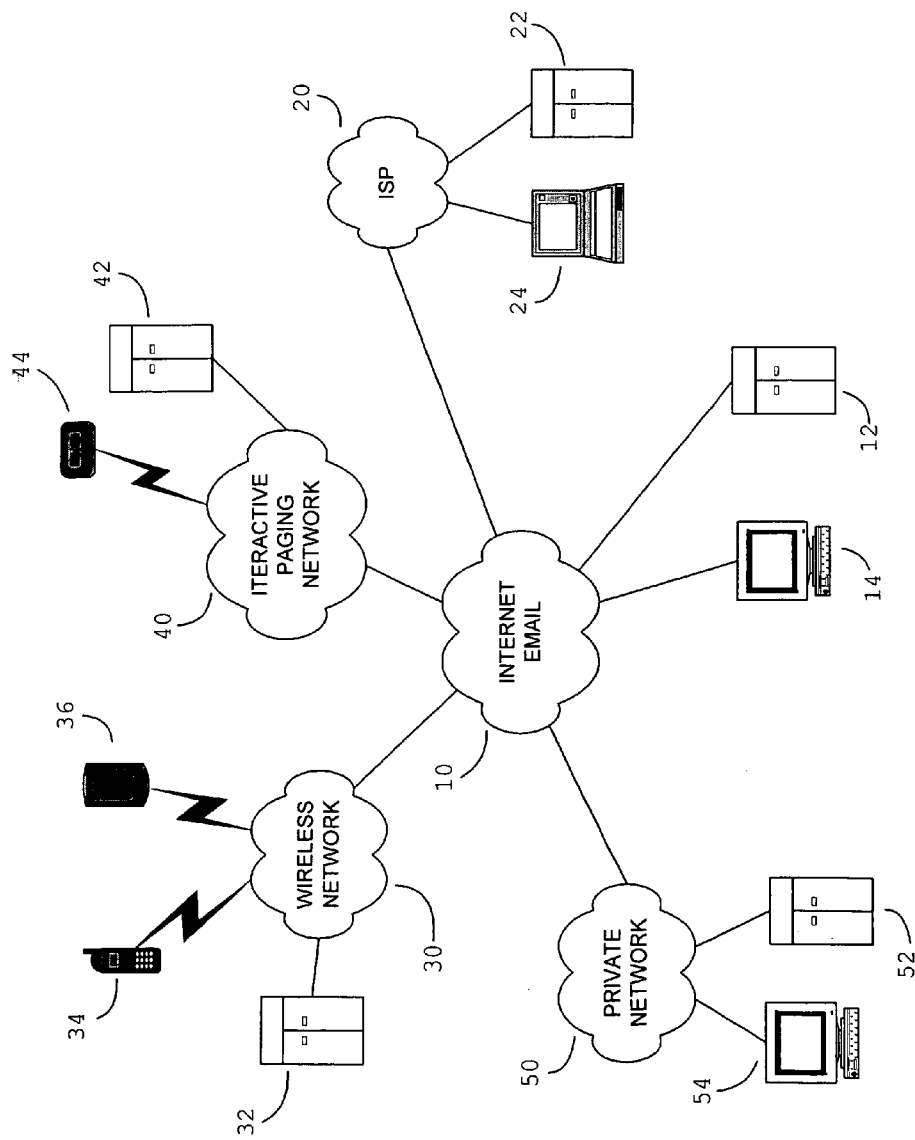
FIG. 1 is a schematic diagram of a network architecture in which the present invention may be implemented.

The present invention may be implemented in any network email architecture, such as, e.g., the architecture shown in FIG. 1. In a preferred embodiment, only the email server application on selected email hosts need be modified or supplemented with programming logic and databases according to the present invention. That is, only email server applications allowing remote email management need the additional programming logic. The remote email server applications and associated client application do not need any changes to operate in accordance with the present invention. In an alternative embodiment, the email client applications used by subscribers to issue instruction email messages may be modified or supplemented as described herein.

For purpose of explanation, assume a user (not shown in FIG. 1) has email accounts on each of the hosts and networks described above. That is, assume the user's email addresses for the respective networks are as shown in Table 1, below. Assume, further for purposes of the present example, that the user wishes to manage email on email hosts 12, 22 or 52 via remote email accounts accessible via mobile telephone 34, PDA 36 or interactive pager 44. In this case, the email server applications running on email hosts 12, 22 and 52 are referred to herein as "source server applications" and the user's accounts on wireless network 30 and interactive paging network 40 are referred to herein as "destination addresses."

TABLE 1

| NETWORK | EMAIL ADDRESS |
| --- | --- |
| Internet Email Network 10 | John.Doe@emailhost12.com |
| ISP Network 20 | john@emailhost22.net |
| Wireless Network 30 | jdoe@emailhost32.wireless.com |
| Interactive Paging Network 40 | jdoe@emailhost42.paging.net |
| Private Network 50 | John_Doe@emailhost52.work.com |

In the preferred embodiment, the present invention is implemented by adding programming logic to the source server application. For example, the source server applications running on email hosts 12, 22 and 52 would include programming logic for interpreting instructions from authorized users and acting accordingly. Email hosts 32 and 42 could also include the programming logic for interpreters such instructions if the user wishes to remotely manage email on accounts in those networks.

Figure 2:
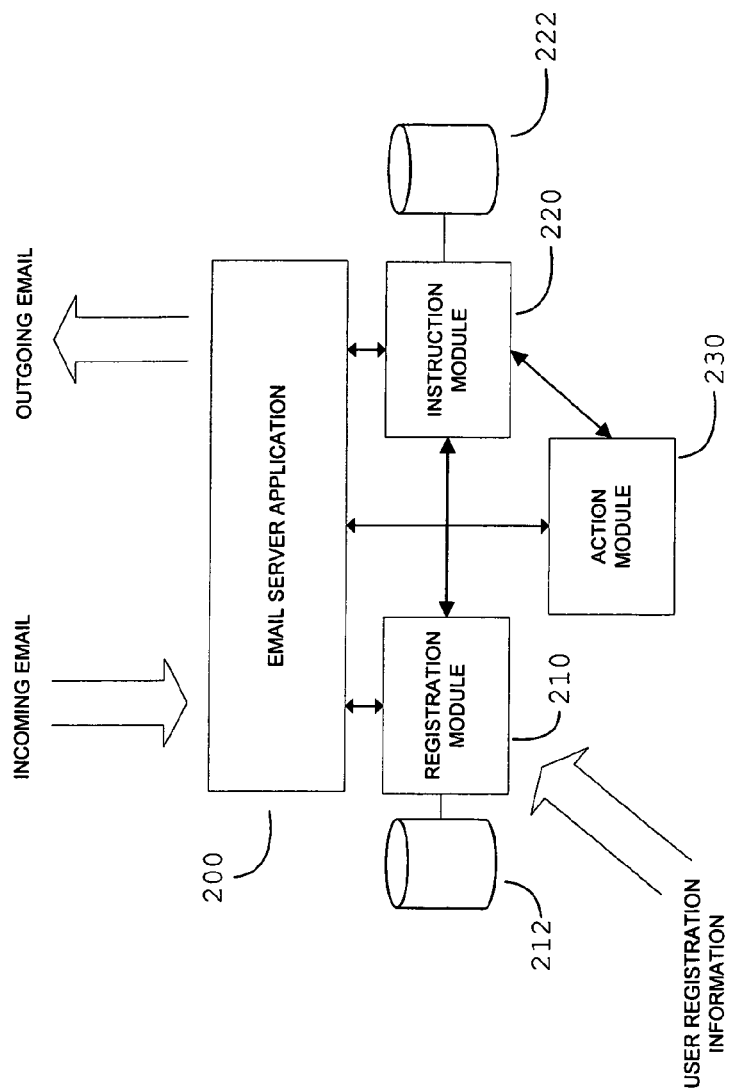
FIG. 2 is a functional diagram showing data flow and programming logic used in a preferred embodiment of the present invention.

FIG. 2 shows a schematic diagram of a source application server and the programming logic added in the preferred embodiment of the present invention. As shown in FIG. 2, the programming logic comprises a plurality of program modules. The modules may be external applications called by email application server 200 as shown in FIG. 2, or alternatively, one or more of the modules may be integral to application server 200. The modules in the preferred embodiment include registration module 210, instruction module 220 and action module 230. As shown in FIG. 2, registration module 210 and instruction module 220 each interfaces with a database. Although databases 212 and 222 are shown as different databases, they could comprise a single database storing the information needed to carryout the present invention. Moreover, the information may be integral to the modules or email server application 200, in which case no separate database is required.

Registration module 210 uses database 212 to store user registration information. Registration information may comprise a list of valid destination addresses for each user and may further include a password selected by the user for access control. User registration information may be transmitted to registration module 210 using any suitable means. For example, the requests may be provided via an interactive form submitted using a web browser interface. Alternatively, the requests may be provided via email from the user. The request could even be manually entered by a technician upon oral or written request by the user. The registration module may also provide any user interface features desirable for allowing users to identify all destination addresses that from which the user may manage his or her email according to the present invention.

In the present example, because the user wishes to remotely manage accounts from wireless network 30 and paging network 40, the user's email addresses on those networks must be registered in the source server applications. That is, the user would register destination addresses jdoe@emailhost32.wireless.com and jdoe@emailhost42.paging.net via a registration module on email hosts 12, 22 and 52. By registering a destination address on a source server, the user authorizes the source server application to accept email management instructions received from the destination address. For example, if the user wishes to retrieve email from his or her private network account to his or her interactive pager account, the user must register the address jdoe@emailhost42.paging.net on email host 52. To request retrieval of the email, the user sends an email message from interactive pager 44 to email host 52 as described below.

User management instructions are sent via email messages from the destination address to the source server. In one embodiment, the user's email message includes a special code in a predetermined field to identify the email message as a request for remote management by the user. In this case, when the source server receives incoming email message it checks the predetermined field for the special code. If the code is present in the predetermined field, the email message is passed to instruction module 220 for further processing. For example the special code may be a particular character string, such as, e.g., "#" or "*MANAGE EMAIL*" or some other string or symbol which flags an incoming email message for special processing. The predetermined field could be any of the fields comprising an email message. Preferably, the predetermined field is either the subject field or the email message body. In an alternative embodiment, the user addresses the email to a special account on the source server. In this case, all email addressed to the special account is passed on to instruction module 220 for processing In either case, instruction module 220 or email application server 200 consult with registration module 210 and database 212 to verify that the sender of the email message is authorized to remotely manage an email account. If the sender is authorized, i.e., if the email message was received from a registered destination email address, instruction module 220 parses the message to determine the appropriate instructions. In the sender is not authorized, then no further action need be taken by the system of the present invention. The system may optionally send an error message in reply to the received email message to inform the sender of the problem.

The user's instructions are inserted in the email in a predefined format. For example, the instructions may inserted into the email subject field and may include a command and a criteria. The command identifies the actual email management instructions the user wishes to perform and the criteria identifies the email messages to be acted on. In a preferred embodiment, if no criteria is provided, the command performed on all of the user's email on the source server. Also, in a preferred embodiment, the command may blank, which may indicate some default command, such as retrieve, should be executed.

In a preferred embodiment, the commands include management operations such as send; delete; forward (to another account); send without attachments, send only attachments; move (to a folder or directory on the source server); print; and the like. Also in the preferred embodiment, multiple commands may be issues in a single email messages. For example, the user may instruct the source server to send the user's email to the destination address, then delete the email from the user's mailbox on the source server. The criteria used to identify email messages may include a boolean operation, such as, e.g., "DATE>YESTERDAY" (all email received since yesterday); "FROM=jane.doe@home.com" (all email received from the address jane.doe@home.com), or "DATE=21-jun-2000 and SUBJ < > 'important document'" (all email received on the date, Jun. 21, 2000 and containing the phrase "important document" in the subject field). The criteria need not be boolean-based, that is, any suitable syntax may be used to allow the user to identify a particular email message or class of email messages to be managed according to the system and method of the present invention. Moreover, the email messages to be managed could even include email in the user's "outbox," i.e., the criteria could allow the user to identify email messages sent by the user from the source server. Instruction module may consult database 222 for valid boolean operators and fields which may be operated upon. Database 222 may also comprise the user's email account (i.e., the user's inbox and outbox).

After instruction module 220 determines the user's management commands and identifies the email messages to be operated on, action module 230 in invoked. As shown in FIG. 2, either instruction module 220 or email server application 200 may invoke action module 230. Action module 230 prepares the selected email messages according to the user's instructions. For example, action module 230 may instruct email application server 230 to forward the selected email to the destination address. In a preferred embodiment, action module 230 further formats the email messages for easy identification at the destination address. For example, action module 230 may modify the subject field of the message to indicate the true sender's name. Such modification is useful because the message sent to the destination address will have a new sender, such as the user's account on the source server or some other account on the source server. By modifying the subject field, the user can identify the message's original sender. Similarly, the subject field could be modified to include the criteria provided by the user in the email instruction message. Again, such modification would assist the user in identifying the email once it is received at the destination address.

Registration database 212 may further comprise a list of device types and associated device capabilities for each registered destination email addresses. Such information can be used to validate instructions sent by the user. For example, database 212 may include an annotation that wireless telephone 34 does not have the capability to receive binary attachments. Accordingly, if the user sends an instruction that would otherwise result in a binary attachment being transmitted to wireless telephone 34, instruction module 220 or action module 230 may consult database 212 to determine whether or not the action should be taken.

In another alternative embodiment, registration database 212 may comprise a password or personal identification number ("PIN"). In this embodiment, the user is not limited to using only registered destination email addresses for remotely managing email on the source server. That is, the user may send an email instruction from any email account, provided that the instruction email includes the password or PIN. Preferably, the instruction email is encrypted by the user to protect the password or PIN. If the email is encrypted, the email server application includes the key needed to decrypt the email for further processing.

The present invention may further comprise programming logic added to an email client application. Such programming logic includes a user-friendly interface for constructing email instruction messages according to the present invention. Accordingly, a user need not memorized or use a complex syntax for identifying the email messages to be managed. Moreover, the user need not know the command structure required by the instruction module on the email application server-side.

Figure 3B:
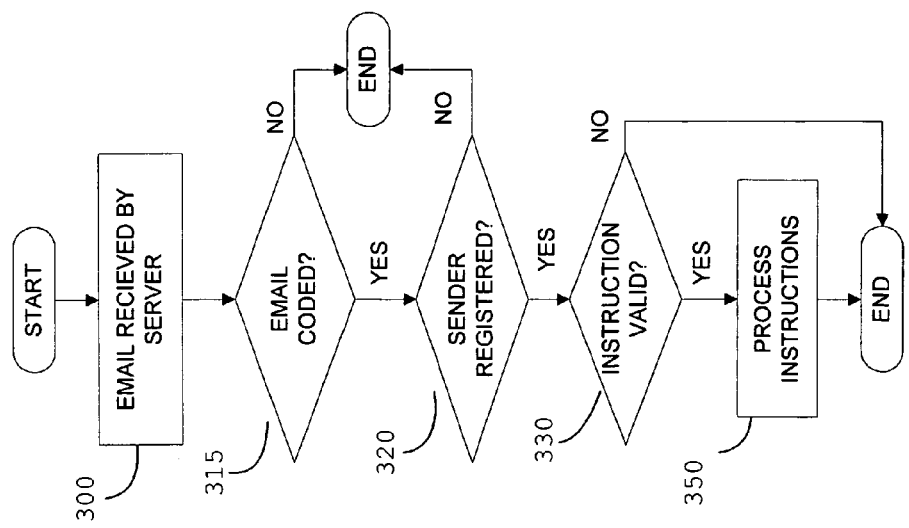
FIG. 3b is a flow chart of steps carried out in an alternative embodiment of the present invention.
Figure 3A:
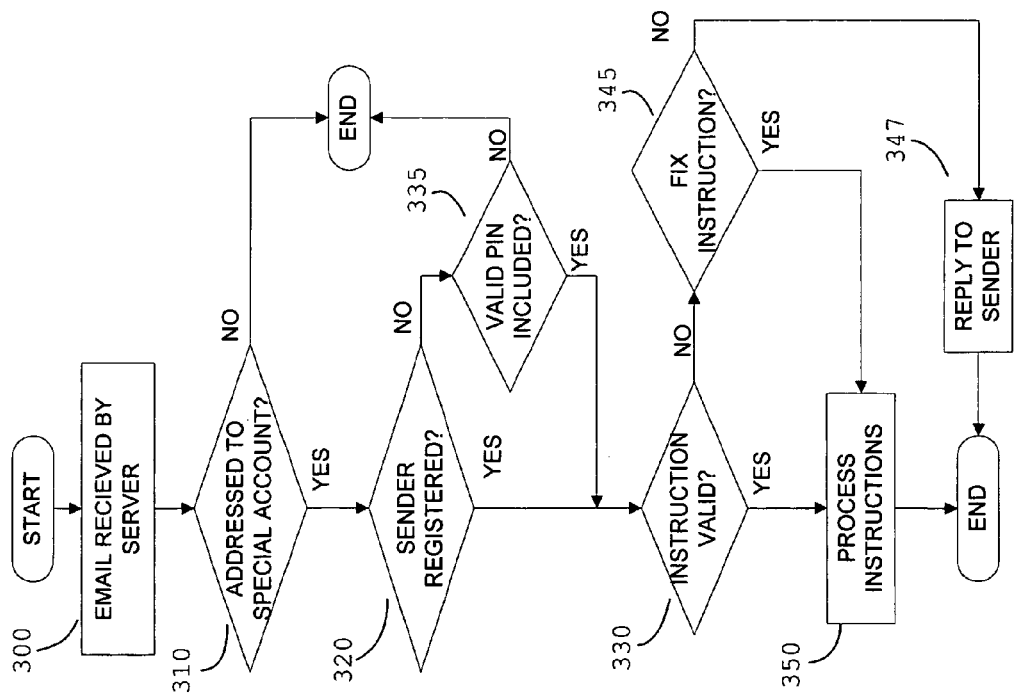
FIG. 3a is a flow chart of steps carried out in a preferred embodiment of the present invention.

The flow charts in FIGS. 3a and 3b show the steps implemented in an embodiment of the present invention. In FIG. 3a, the email server application accepts email messages directed to a special account setup to receive email instructions according to the preferred embodiment of the present invention. In contrast, the flow chart in FIG. 3b shows email server application implemented using the alternative embodiment of checking incoming email for the special code in some predetermined field, such as the subject field of the message.

In step 300, an email message is received by an email server application (for example email server application 200 shown in FIG. 2) on an email host, such as email host 52 in private network 50. In step 310, the system determines if the email message is addressed to the special account for handling according to the present invention. If the email is not addressed to the special account, the message is processed according to normal email channels and the system and method of the present invention ends processing. If the email message is addressed to the special account, step 320 is performed. In step 320, registration database 212 is checked to determine whether or not the sender of the email is a registered destination email address. Step 320 may be performed directly by email server application 200 or by instruction module 220 or even registration module 210. As shown in FIG. 3a, if the sender is registered, the system moves on to step 330. If the sender is not a registered destination email address, the system may perform optional step 335 and check the email message to see if a valid PIN or password is included. If a PIN or password is included in the message it is checked against database 212 for validity. If the PIN or password is not valid, the system exits. In an alternative embodiment, an additional step may be included such that an error message is sent to the sender of the email. If the PIN or password is valid, the system moves on to step 330.

In step 330, instruction module 220 parses the email message to determine the user's instructions for remotely managing email on the source server. As described above, the instruction may comprise a plurality of commands and a plurality of criteria for selecting email messages to be managed. In step 330, instruction module ensures that the instruction is valid and can be performed as requested. If the instruction is not valid, the system may attempt to fix the instruction in optional step 345. If the user's instructions cannot be fixed, the system may move on to optional step 347, where the user is sent a reply message. If optional step 345 is implemented in an embodiment of the present invention, the fixed instruction preferably is non-invasive, that is, the system will not destroy email messages on the source server without express instructions from the user. As described above, a situation where the system could fix the instruction may arise if database 212 also includes device type information associated with each destination email address. In this case, if the user requests attachments to be sent, but the device cannot receive such input, the user's instruction may be modified to send only the main part of the email but no attachments. Similarly, the user's instruction may be modified to instead send an error or other informational message to the user.

If the user's instruction is valid or is fixed in step 345, the system moves on to step 350 for further processing according to the present invention. In step 350, the user's instructions are processed by action module 230. As described above, actions taken may include a number of email management tasks. For example, the action may be to send selected email messages to the user followed by deleting the email from the user's inbox.

The flow chart in FIG. 3b shows many of the same steps described above. For simplicity, optional steps, such as steps 345 and 347, are omitted from FIG. 3b. However, these optional steps and others may be included in this embodiment if desired. The primary difference between the embodiment shown in FIG. 3b and that shown in FIG. 3a, is how the system determines that an email received by the email server application comprises a request for remote management from a user. As shown in FIG. 3b, step 310 (determining that the email is sent to a special account) is replaced by step 315. In step 315, a predetermined field of the email message is checked for a special code. In a preferred embodiment, the predetermined field is the subject field and the special code is comprises a character or string of characters not commonly included in a subject field. The code may also comprise the users instructions for remote management. The remaining steps shown in FIG. 3b are the same as shown in FIG. 3a.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

I claim:

1. A method for managing a predetermined set of email messages stored on a source email server from a remote email network, said method comprising:
    (a) receiving an email at the source email server, wherein the email is separate from the predetermined set of emails stored on the source email server, wherein said email has a destination email address in a first field, a code in a second field and an instruction in a third field, wherein said destination email address corresponds to a subscriber account on the remote email network;
    (b) checking a database to determine if the destination email address has permission to implement the instruction; and
    (c) applying the instruction to the predetermined set of emails if the permission is granted.

2. The method of claim 1, further comprising populating the database with subscriber email addresses corresponding to subscriber accounts authorized to remotely manage email.

3. The method of claim 2, further comprising populating the database with a device type associated with each subscriber email address, and wherein checking the database further comprises checking the database for the device type corresponding to the destination email address, determining if the device type is compatible with the instruction, and modifying the instruction according to the device type.

4. The method of claim 2, further comprising receiving a second email at the source email server, wherein said second email comprises a local subscriber's identification in a sender field and wherein said second email comprises at least one subscriber email address in a body field.

5. The method of claim 1, wherein the code comprises a predetermined data string and wherein the second field is a subject field.

6. The method of claim 1, wherein the first field is a sender field.

7. The method of claim 1, wherein the code comprises a predetermined data string and wherein the second field comprises an addressee field.

8. The method of claim 7, wherein the predetermined string corresponds to an email account on the source server.

9. The method of claim 1, further comprising sending an information message to the destination email address if the permission is denied.

10. The method of claim 1, wherein the instruction is a retrieve command, and wherein in response to said instruction, applying the instruction to the predetermined set of emails comprises sending the predetermined set of emails to the destination email address.

11. The method of claim 1, wherein the instruction comprises a command and a criteria, and wherein in response to said instruction, applying the instruction to the predetermined set of emails further comprises searching a mailbox associated with the subscriber account to select the predetermined set of emails according to the criteria.

12. The method of claim 11, wherein the command is a retrieve command.

13. The method of claim 11, wherein the command is a delete command.

14. The method of claim 11, wherein the command comprises a retrieve command and a delete command.

15. The method of claim 11, wherein the criteria comprises a sender's name string.

16. The method of claim 11, wherein the criteria comprises a subject string.

17. The method of claim 11, wherein the criteria comprises a date string.

18. The method of claim 11, wherein the criteria comprises a boolean operation and a plurality of date strings.

19. The method of claim 11, wherein the criteria comprises a subject string and a sender's name string.

20. The method of claim 11, wherein the criteria comprises a recipient name string.

21. The method of claim 1, wherein the third field comprises a body field.

22. The method of claim 1, wherein the instruction comprises a null string and wherein applying the instruction to the predetermined set of emails comprises performing a default action on the predetermined set of emails.

23. A method for managing a predetermined set of emails previously stored on a source email server from a remote email network, said method comprising:
    (a) populating a database with subscriber email addresses corresponding to subscriber accounts authorized to remotely manage emails;
    (b) receiving an email at the source email server, the email not included in the predetermined set of emails previously stored on a source email server, wherein said email has a destination email address in a first field, a code in a second field and an instruction in a third field, wherein said destination email address corresponds to a subscriber account on the remote email network;
    (c) checking the database to determine if the destination email address has permission to implement the instruction; and
    (d) applying the instruction to the predetermined set of emails if the permission is granted.

24. The method of claim 23, further comprising sending an information message to the destination email address if the permission is denied.

25. The method of claim 23, further comprising populating the database with a device type associated with each subscriber email address, and wherein checking the database further comprises checking the database for a device type corresponding to the destination email address, determining if the device type is compatible with the instruction, and modifying the instruction according to the device type.

26. The method of claim 23, wherein populating a database further comprises receiving a second email at the source email server, wherein said second email comprises a local subscriber's identification in a sender field and at least one subscriber email address in a body field and wherein the database is populated with said at least one subscriber email address and said local subscriber's identification.

27. The method of claim 23, wherein the instruction is a retrieve command, and wherein in response to said instruction, applying the instruction to the predetermined set of emails comprises sending the set of emails to the destination email address.

28. The method of claim 23, wherein the instruction comprises a command and a search criteria, and wherein in response to said instruction, applying the instruction to the predetermined set of emails further comprises searching a mailbox associated with the subscriber account to select the predetermined set of emails according to the search criteria.

29. The method of claim 28, wherein the command is a retrieve command.

30. The method of claim 28, wherein the command is a delete command.

31. The method of claim 28, wherein the command comprises a retrieve command and a delete command.

32. The method of claim 28, wherein the search criteria comprises a sender's name string.

33. The method of claim 28, wherein the search criteria comprises a subject string.

34. The method of claim 28, wherein the search criteria comprises a date string.

35. The method of claim 28, wherein the search criteria comprises a boolean operation and a plurality of date strings.

36. The method of claim 28, wherein the search criteria comprises a subject string and a sender's name string.

37. The method of claim 28, wherein the search criteria comprises a recipient name string.

38. A method for remotely retrieving a first email from a source email server to a destination email address having a standard email client application, said method comprising:
   (a) populating a database with subscriber email addresses corresponding to subscriber accounts authorized to remotely retrieve emails;
   (b) receiving a second email on the source server, wherein said second email has the destination address in a sender field and a code in a predetermined field;
   (c) checking the database to verify that the destination email address is authorized to implement the code; and
   (d) sending, in response to the code, the first email from the source email server to the destination email address.

39. The method of claim 38, wherein the predetermined field is a subject field.

40. The method of claim 38, wherein the predetermined field is a addressee field.

41. The method of claim 38, wherein the second email further comprises an instruction in a second predetermined field, and wherein said method further comprises processing said instruction to manipulate the first email according to the instruction.

42. The method of claim 41, wherein the second predetermined field is a body field.

43. The method of claim 38, further comprising deleting the first email from the source email server after sending the first email.

44. A method for remotely managing a first email on a source email server from an email account on a remote email server, said method comprising:
   (a) receiving a second email on the source server, wherein said second email has a code in a first predetermined field;
   (b) checking a database for a subscriber account corresponding to a sender field in the second email; and
   (c) processing the first email according to an instruction in a second predetermined field if the email account on the remote email server is authorized to implement the instruction.

45. The method of claim 44, wherein the first predetermined field is a subject field.

46. The method of claim 44, wherein the second predetermined field is a body field.

47. The method of claim 44, wherein the instruction comprises a command and a criteria, and wherein in response to said instruction, processing the first email further comprises searching a mailbox associated with the subscriber account to select the first email according to the criteria and executing said command on the first email.

48. The method of claim 44 further comprising populating the database with a plurality of subscriber accounts and associated subscriber email addresses.

49. A system for managing a predetermined set of emails on a source email server from a remote email network, said system comprising:
   (a) a registration database on the source server, said registration database comprising a local subscriber account on said source server and an associated destination email address on the remote email network;
   (b) a first module on the source email server, wherein when a first email having a code in a first field, the first email not included in the predetermined set of emails previously stored on a source email server, an instruction in a second field of the first email and a sender email address in a sender field is received on the source email server, said first module determines if the sender email address is in the database; and
   (c) a second module on the source server, wherein if the sender email address is in the database, the second module applies the instruction to the predetermined set of emails if the second module has authorization to implement the instruction.

* * * * *